United States Patent [19]
> Catanzarite

[11] 3,837,942
[45] Sept. 24, 1974

[54] LOW TEMPERATURE GAS GENERATING COMPOSITIONS AND METHODS

[75] Inventor: Vincent O. Catanzarite, Las Vegas, Nev.

[73] Assignee: Specialty Products Development Corporation, Medina, Ohio

[22] Filed: Dec. 14, 1972

[21] Appl. No.: 314,916

Related U.S. Application Data

[63] Continuation-in-part of Ser. No. 234,312, March 13, 1972, abandoned.

[52] U.S. Cl................... 149/83, 149/22, 149/40, 149/41, 149/79, 149/85, 102/39, 280/150 AB
[51] Int. Cl............................................. C06b 11/00
[58] Field of Search............ 149/22, 40, 41, 42, 44, 149/85, 79, 83; 280/150 AB; 141/10; 102/39

[56] References Cited
UNITED STATES PATENTS

| | | | |
|---|---|---|---|
| 3,532,359 | 10/1970 | Teague et al.................. | 280/150 AB |
| 3,647,393 | 3/1972 | Leising et al..................... | 102/39 X |
| 3,663,035 | 5/1972 | Norton.......................... | 280/150 AB |
| 3,676,234 | 7/1972 | Schwoyer............................. | 149/44 |
| 3,690,695 | 9/1972 | Jones................................ | 102/39 X |
| 3,692,495 | 9/1972 | Schneiter et al............. | 280/150 AB |

*Primary Examiner*—Stephen J. Lechert, Jr.
*Attorney, Agent, or Firm*—Christie, Parker & Hale

[57] ABSTRACT

A pyrotechnic powder composition comprising a mixture of an oxidizer powder and an oxygen bearing metal organic compound powder is used for inflating a passenger restraint bag for an automobile. Metals preferred for the metal organic compound have a free energy of oxidation less than the free energy of oxidation of carbon monoxide. An exemplary composition comprises a mixture of anhydrous nickel formate and potassium chlorate. When these react, substantial volumes of oxygen, carbon dioxide and water vapor are released for inflating a passenger restraint bag. The burning rate of the powder composition may be increased by including up to about 20 percent of an enhancer distributed in the powder and having a burn rate substantially higher than the burn rate of the powder composition.

33 Claims, No Drawings

LOW TEMPERATURE GAS GENERATING COMPOSITIONS AND METHODS

This application is a continuation-in-part of my U.S. Pat. application Ser. No. 234,312 entitled "Low Temperature Gas Generating Composition & Method" filed Mar. 13, 1972 now abandoned.

BACKGROUND

Governmental requirements for automobile passenger restraint systems include an inflatable bag that momentarily and temporarily restrains a passenger during the critical instant of a collision impact. For safe and successful use, the bag must be inflated in a very short time and thereafter deflated to release the passenger. The gas used to inflate the bag must be cool enough to avoid damage to the bag and injury to the passenger.

It has been found that substantial amounts of water vapor in the gas used to inflate the bag tend to limit the temperature range of operability of a passenger restraint system. Present requirements call for the system to perform properly at temperatures as low as −40°F and as high as 200°F. At low temperatures excess water may condense and under inflation of the bag may occur. At the higher temperatures the water vapor may tend to over inflate the bag and condensation of water on the bag's surfaces may unduly increase its temperature with a possibility of injury to passengers.

In some embodiments deflation of the bag is obtained by using a fabric of controlled porosity, since the entire phenomenon of passenger restraint is kinetic. Thus, the bag rapidly inflates without a substantial pressure gradient across the fabric and little gas flows therethrough during the short time interval of inflation. Substantial pressures may be created in the bag as it restrains a passenger during impact and the energy of the passenger is dissipated over a period of time which is controlled by the porosity of the fabric. Quite a bit of gas is pushed out of the bag during this time. Subsequently the bag deflates as gas flows through the fabric over a somewhat longer period of time. Since the gas in such an embodiment is dissipated in the passenger compartment of the automobile in close proximity to the passenger being restrained, low temperature and low toxicity are of appreciable importance. With carbon bearing compositions used in a pyrotechnic gas generator for such a passenger restraint system, carbon monoxide may be formed. Stringent restrictions on the tolerable carbon monoxide in combustion gases have been established. It is also desirable to minimize the quantity of carbon dioxide insofar as possible, since certain susceptible persons may undergo unfavorable physiological reaction with high carbon dioxide exposure. Preferably such gases are replaced with oxygen.

It is therefore desirable to provide pyrotechnic compositions that burn to produce a large volume of relatively cool, non-toxic smoke-free gas in a short time interval for inflating a passenger restraint bag. Preferably the carbon monoxide, carbon dioxide and water vapor content of the gas are minimized and the oxygen content kept high.

BRIEF SUMMARY OF THE INVENTION

Thus in practice of this invention according to a presently preferred embodiment, there is provided a relatively cool non-toxic gas generating composition comprising a mixture of an oxidizer compound containing oxygen and a metal selected from the group consisting of sodium, potassium, lithium, barium, magnesium and calcium, and an oxygen bearing metal organic compound wherein the metal has a free energy of oxide formation less than the free energy of oxidation of carbon monoxide. A burning rate enhancer may also be included in the composition.

DESCRIPTION

It is known that one can mix an oxidizer powder in an organic powder and ignite them to produce a mixture of carbon dioxide and water vapor for inflating a passenger restraint bag for an automobile. Such powders are mixed and packed into a cavity in a gas generator. An electrical initiator is provided in the cavity for adding a sudden localized burst of energy for raising the temperature of the propellant mixture well above its ignition temperature. Once ignited the entire mixture is typically consumed to produce carbon dioxide and/or water vapor which are directed to a passenger restraint bag for inflation.

The same general technique is employed in practice of this invention, except that compositions are provided with low net heat of reaction and which produce substantially smoke-free gasses. The quantity of water vapor in the resultant gas is controlled and can be limited, oxygen content of the bag inflation gas can be high and carbon monoxide formation is suppressed.

The oxidizers employed in practice of this invention are compounds including oxygen and a metal, and are preferably selected from the class of the chlorates and perchlorates of sodium, potassium, lithium, barium, magnesium and calcium. In addition, the peroxides, superoxides and permanganates of these metals may be suitable. Other oxidizers that are suitable include chlorates of aluminum, cadmium, lead, and nickel; perchlorates of barium, lead, manganese and nickel; ammonium chlorate; ammonium perchlorate; cobaltous chlorate; cobaltous perchlorate; cupric chlorate; and ferrous perchlorate. Some of these are more hygroscopic than the preferred materials and need protection from water vapor. The ammonium chlorate and ammonium perchlorate yield ammonium chloride upon reaction. The chlorates and perchlorates are particularly preferred, since the non-gaseous product resulting from reaction is the chloride of the metal. The combination of the metal chloride with other metal containing reaction products can serve to make a low melting mixture which collects on the walls of the gas generator rather than being carried into the passenger restraint bag. Reaction products with low melting points can be molten if the flame temperature is sufficiently high, and with some compositions provided herein, the combination of low melting point and high flame temperature results in molten reactants. Such molten products condense on cooler portions of the gas generator and minimize smoke reaching the bag.

The pyrotechnic composition also includes an oxygen containing metal organic compound which reacts with the oxidizer when the pyrotechnic or propellant mixture is ignited. A number of oxygen bearing metal organic compounds are suitable. Preferred compounds include cobaltous acetate, cobaltous oxalate, cupric formate, cupric acetate, cupric oxalate, ferric acetate, ferric oxalate, ferric formate, ferrous formate, ferrous acetate, ferrous tartrate, ferrous oxalate, ferrous lactate, lead formate, lead acetate, lead oxalate, nickel formate, nickel acetate, nickel oxalate, silver acetate, silver citrate, silver tartrate, silver oxalate and stannous oxalate. Reaction of any of these materials with the above-identified oxidizers yields a large volume of gas in the form of carbon dioxide and water vapor without unduly high caloric outputs. By mixing various oxygen containing metal organic compounds in the pyrotechnic composition, a broad range of net heat outputs can be provided.

The preferred metal organic compounds include the above-identified metal ions since they have a free energy of oxidation less than the free energy of oxidation of carbon monoxide. This property is of importance since the presence of such metals in the propellant mixture suppresses formation of carbon monoxide and instead promotes formation of carbon dioxide.

Free energy of formation of many metal oxides as a function of temperature are set out by F. D. Richardson and J. H. E. Jeffes in *Journal of the Iron & Steel Institute*, Vol. 160, P. 261 (1948) and in *Physical Chemistry of Metals* by L. S. Darken and R. W. Gurry. (McGraw-Hill, 1953) at page 349. Suitable metals having a free energy of oxidation less than the free energy of oxidation of carbon monoxide in the temperature ranges of interest in practice of this invention include cobalt, copper, lead, nickel, silver, tin and under some conditions iron.

The metal formates identified above are preferred in practice of this invention since the net heat of reaction with an oxidizer is quite low and yet the reaction is sufficiently exothermic that once initiated it continues to completion. The net heat of a pyrotechnic composition can be reduced by including a metal oxalate along with the metal formate. This reduces the temperature of the reaction products.

It is preferred that the metal organic compound employed in the propellant mixture include copper, tin, nickel, or cobalt as the metal ion. These materials combine a number of desirable features including low cost, ready availability, low toxicity, and a free energy of oxide formation that is less than the free energy of oxidation of carbon monoxide under all conditions involved in gas generators.

The commercially available metal organic compounds mentioned above often include some water of crystallization. It is preferred to employ the anhydrous compounds insofar as possible to limit the amount of water in the combustion gasses. The water of crystallization also tends to reduce the net heat of reaction and reduce the burning rate. Thus, for example anhydrous nickel formate burns more rapidly and with less water in the combustion gasses than does commercially available nickel formate which includes water of crystallization. Commercially available material is dehydrated by simply heating it above the temperature where the water of crystallization is driven off. Measurements of weight loss indicate that quantitative removal of the water of crystallization is readily obtained.

The anhydrous compounds are preferred for reducing the quantity of water vapor in the combustion gasses passing to the inflatable bag. Present requirements for gas generators call for operation of the generator over a temperature range from −40°F to +200°F. When the gas generator is at −40°F there is a tendency for water vapor to condense on the cooler metal surfaces of the gas generator so that the volume of gas that passes to the inflatable bag is reduced. In addition, the water vapor may condense too soon in the bag leading to premature partial deflation. Thus, at the low temperature end of the operating range, a high proportion of water vapor in the combustion gasses may lead to under-inflation of the bag and premature partial deflation.

At the high end of the temperature range of operation little of the water vapor condenses and substantially all of it is present in the gas entering the inflatable bag. This may lead to over-inflation of the bag and the consequent high pressure may decrease the effectiveness of the restraint. In addition, the water vapor condensing on the bag surfaces gives up its heat of vaporization and increases the temperature of the bag surfaces. Although this is not a severe problem, it can make the bag uncomfortably warm. It is, therefore, important to have an appropriate balance of water vapor in the combustion gasses so that there is sufficient pressure in the bag for operation at the low temperature end of the operating range and still not have an excessive pressure at the high temperature end.

A particularly preferred oxygen bearing metal organic powder useful in practice of this invention is anhydrous nickel formate. Preferably this material is reacted with potassium chlorate to produce combustion gasses for inflating the passenger restraint bag. The anhydrous nickel formate may also be reacted with potassium perchlorate, sodium chlorate or sodium perchlorate if desired. The preferred combination of anhydrous nickel formate and potassium chlorate has a low net heat of reaction, controlled water vapor content in the combustion gasses, a good burning rate for this application, is stable over the entire operating range, and suppresses carbon monoxide formation.

The anhydrous nickel formate powder is preferably present in the proportion of from about 20 to 65 percent by weight with the proportion of potassium chlorate ranging from about 35 to 80 percent by weight. Throughout this range the formation of carbon monoxide is suppressed and suitable burning rates and times are achieved for use in a gas generator in an automobile passenger restraint system. Outside of these ranges it becomes increasingly difficult to sustain reaction and such a mixture may not be suitable for a reliable gas generator. It should be noted, however, that the nickel formate can be decreased to about 10 percent by weight in the composition by combination with a burning rate enhancer distributed through the propellant mixture. Several such burning rate enhancers are described hereinafter.

Preferably the propellant comprises about 25 percent by weight of nickel formate and 75 percent by weight of potassium chlorate. This proportion appears to give the optimum balance of net heat of reaction, gas composition, burning rate, and total burning time. It will be noted that this composition is substantially richer in oxidizer than the stoichiometric proportion and the decomposition of potassium chlorate during the reaction assures a high proportion of oxygen in the resultant gas.

The preferred composition may also include about 5 percent by weight of a burning rate enhancer which is preferably a near stoichiometric mixture of about 22 percent by weight starch and 78 percent by weight potassium chlorate. These powders can be intimately mixed with the propellant powders or may be bonded into tiny beads distributed through the propellant.

Clearly since potassium chlorate is common to both the propellant mixture and the burn rate enhancer, the composition may, for example, comprise about 75 percent potassium chlorate, 24 percent anhydrous nickel formate and 1 percent starch.

The burning rate enhancer increases the net heat of reaction somewhat but appears to increase the rate of burning by more than would be expected, so that gas is supplied to the inflatable bag in a short time interval for proper passenger restraint. The stoichiometric mixture of starch and potassium chlorate is a preferred burning rate enhancer since the gaseous products of the combustion are carbon dioxide and water vapor and no toxicity problems whatsoever are introduced. Similar oxygen bearing organic materials and oxidizer powders compatible with the propellant mixture will be apparent. Other materials are also suitable such as, for example, tiny pellets of zirconium metal and potassium perchlorate distributed in the propellant powder. Similarly, it has been found suitable to use a stoichiometric mixture of boron and potassium nitrate bound together in tiny grains. Tiny grains of conventional double based propellant are also suitable. Many other burning rate enhancers of this nature will be apparent.

Preferably the burning rate enhancer is present in a proportion in a range of from about 3 to 5 percent for optimum increase in the burn rate without introduction of substantial quantities of other gasses or undesirable increase in the net heat of reaction. Higher quantities of burning rate enhancer are acceptable up to about 20 percent by weight.

Even with the burning rate enhancer, reaction is not unduly fast and it may be desirable to ignite a rather large surface of the propellant mixture in the gas generator in order to obtain a sufficiently short total burn time. An inert non-crushable separator phase may also be distributed in the propellant powder to assure proper burning characteristics.

The burning time can be improved by energetic initiation of the combustion of the powder mixture. Such initiation of the reaction can be accomplished by a variety of chemical reactions that generate high temperatures. Many such initiators, however, introduce toxic gasses and should be avoided. It is, therefore, particularly preferred to initiate the reaction in the gas generator by a deflagration mixture formed of the powders of an inorganic oxidizer compound and an oxygen bearing organic fuel. Generally speaking, the oxidizer compounds hereinabove identified are suitable for the initiation mixture. In particular, the chlorates and perchlorates of the alkali metals are preferred.

The oxygen bearing organic fuel is one having a formula $C_xH_yO_z$ where $x$, $y$ and $z$ are integers. The powder should have an average particle size less than about 25 microns and be solid at all temperatures below about 165°F in order to be satisfactory for an automobile passenger restraint system. Suitable organic fuels can be selected from the group consisting of sucrose, starch, cellulose, dextrose, dextrin, fructose, lactose, ascorbic acid, benzoic acid, maltose monohydrate, mannitol, mannoheptose, mannoheptose monohydrate, oxalic acid, propanediolic acid and glyoxylic acid. Preferably, the oxidizer and fuel are mixed in stoichiometric proportions for producing principally carbon dioxide and water vapor as the gaseous products, since this yields high initiation energy. In a typical embodiment for a 110 gram main charge, as hereinabove described, an initiator mixture of about 6 grams is sufficient. Many other high energy initiation techniques will be apparent to one skilled in the art.

As suggested above, a reaction of important significance to the overall performance of the gas generator system for a passenger restraint bag, involves the non-gaseous products of the reaction between the oxidizer compound and the oxygen bearing metal organic compound. The reaction typically produces a metal oxide and when the chlorates or perchlorates are used, a metal chloride. Such binary mixtures of metal salts have melting points that are below the melting point of either of the metal salts alone.

Preferably the pyrotechnic mixture comprises an intimate combination of oxidizer compound powder and oxygen bearing metal organic powder. This has the advantage of not requiring any binders or cements which could interfere with reaction or introduce toxicity in the combination. Such powders are preferably compacted at light pressures, such as for example, 50 to 100 psi although substantially higher compaction pressures can be employed without significantly affecting the rate of reaction. Preferably, the particle size of the metal organic compound and the oxidizer is less than about 25 microns in order to obtain substantially complete reaction without a residue of unburned materials or undue production of hot reaction particles. When the particle size of both the metal organic powder and the oxidizer powder is less than about 5 microns, substantially complete reaction therebetween is virtually certain and unintentional formation of carbon monoxide thereby inhibited.

A number of pyrotechnic compositions in accordance with principles of this invention have been made and tested by igniting them in a gas generator connected to an inflatable passenger restraint bag. In various tests performed, time of bag inflation, pressure in the gas generator, volume of gas produced, temperature of gas in the bag, gas composition, smoke formation and the like have been measured. In addition, the presence or absence of hot particles in the inflation bag and characteristics of deposits in the gas generator have been observed. Other tests include calorimetry, bench tests of burn rate, gas production tests, and the like with an actual bag connected to the gas generator. Among the many tests performed, the following pyrotechnic compositions have performed satisfactorily in tests evaluating performance of this invention:

1. Nickel formate 69%, potassium chlorate 31%;
2. Nickel formate 50%, potassium chlorate 50%;
3. Nickel formate 72%, potassium perchlorate 28%;
4. Nickel formate 65%; potassium perchlorate 35%;
5. Cupric formate 65%, potassium chlorate 35%;
6. Ferrous formate 68%, potassium chlorate 32%;
7. Lead formate 78%, potassium chlorate 22%;
8. Anhydrous nickel formate 20%, potassium chlorate 80%;
9. Anhydrous nickel formate 25%, potassium chlorate 75%;
10. Anhydrous nickel formate 30%, potassium chlorate 70%;
11. Anhydrous nickel formate 40%, potassium chlorate 60%;
12. Anhydrous nickel formate 45%, potassium chlorate 55%;

13. Anhydrous nickel formate 50%, potassium chlorate 50%;
14. Anhydrous nickel formate 60%, potassium chlorate 40%;
15. Anhydrous nickel formate 75%, potassium chlorate 25%;
16. Anhydrous nickel formate 60%, potassium perchlorate 40%;
17. Anhydrous nickel formate 65%, potassium chlorate 35%;
18. Anhydrous cupric acetate 9%, potassium chlorate 91%;
19. Anhydrous cupric acetate 12%, potassium chlorate 88%;
20. Anhydrous cupric acetate 10%, potassium perchlorate 90%;
21. Anhydrous cupric acetate 14%, potassium perchlorate 86%;
22. Anhydrous cupric acetate 6%, ferrous tartrate 4%, potassium chlorate 90%;
23. Ferrous tartrate 15%, potassium chlorate 85%.

In addition, substantially all of the compositions mentioned in examples 8 through 17 have been tested successfully with addition of a burning rate enhancer. The burning rate enhancer employed in this series of tests comprises 22 percent starch and 78 percent potassium chlorate. This was mixed separately and added to the above-mentioned propellant mixes in each of the following proportions 2%, 3%, 4%, 5%, 7%, 10% and 15% of the total. Most of the proportions were tested successfully with most of the compositions of examples 8 through 17. It was observed that a higher proportion of enhancer is desirable when a perchlorate is used in the composition as compared with a composition including a chlorate.

Although numerous embodiments of this invention have been set forth herein, amny additional modifications and variations will be apparent to one skilled in the art. It is therefore to be understood that within the scope of the appended claims the invention may be practiced otherwise than as specifically described.

What is claimed is:

1. A pyrotechnic powder composition consisting essentially of a mixture of one or more inorganic oxidizer powder compounds containing oxygen and a metal selected from the group consisting of sodium, potassium, lithium, barium, magnesium and calcium, and one or more oxygen bearing metal organic powder compounds selected such that a stoichiometric reaction between the oxidizer and the metal organic compound yields gaseous products and wherein the metal in the metal organic compound has a free energy of oxide formation less than the free energy of oxidation of carbon monoxide the proportion of metal organic compound being in the range of from about 15 to 75 percent by weight of the powder composition.

2. A pyrotechnic powder composition as defined in claim 1 wherein the oxidizer compound is selected from the group consisting of chlorates and perchlorates.

3. A pyrotechnic powder composition as defined in claim 2 wherein the metal organic compound is a formate and the metal is selected from the group consisting of copper, tin, nickel and cobalt.

4. A pyrotechnic powder composition as defined in claim 2 wherein the metal organic compound comprises anhydrous nickel formate.

5. A gas generating powder composition as defined in claim 2 further comprising up to about 20 percent by weight of an oxygen bearing organic fuel having a formula $C_xH_yO_z$ where $x$, $y$ and $z$ are integers.

6. A gas generating powder composition as defined in claim 1 further comprising up to about 20 percent by weight of burning rate enhancer.

7. A pyrotechnic powder composition consisting essentially of a mixture of an oxidizer compound containing oxygen and a metal selected from the group consisting of sodium, potassium, lithium, barium, magnesium and calcium, and a metal organic compound selected from the group consisting of cobaltous acetate, cobaltous oxalate, cupric formate, cupric acetate, cupric oxalate, ferric acetate, ferric oxalate, ferrous formate, ferrous acetate, ferrous tartrate, ferrous oxalate, ferrous lactate, lead formate, lead acetate, lead oxalate, nickel formate, nickel acetate, nickel oxalate, silver acetate, silver citrate, silver tartrate, silver oxalate, and stannous oxalate.

8. A pyrotechnic powder composition as defined in claim 7 wherein the oxidizer compound is selected from the group consisting of chlorates and perchlorates.

9. A gas generating powder composition as defined in claim 8 further comprising up to about 20 percent by weight of burning rate enhancer.

10. A gas generating powder composition as defined in claim 9 wherein the burning rate enhancer comprises an oxygen bearing organic fuel having a formula $C_xH_yO_z$ where $x$, $y$ and $z$ are integers and an oxidizer selected from the class consisting of aklali metal chlorates and perchlorates.

11. A gas generating powder composition as defined in claim 8 further comprising up to about 20 percent by weight of an oxygen bearing organic fuel having a formula $C_xH_yO_z$ where $x$, $y$ and $z$ are integers.

12. A gas generating powder composition as defined in claim 8 wherein the metal organic compound comprises anhydrous nickel formate.

13. A gas generating powder composition as defined in claim 7 wherein the proportion of oxidizer compound is in the range of from about 25 to 85 percent by weight and the proportion of metal organic compound is in the range of from about 15 to 75 percent by weight.

14. A gas generating powder composition comprising:
    anhydrous nickel formate in the range of from about 15 to 75 percent by weight and
    oxidizer selected from the class consisting of alkali metal chlorates and perchlorates in the range of from about 25 to 85 percent by weight.

15. A gas generating powder composition as defined in claim 14 further comprising up to about 20 percent by weight of burning rate enhancer.

16. A gas generating powder composition as defined in claim 15 wherein the burning rate enhancer comprises an oxygen bearing organic fuel having a formula $C_xH_yO_z$ where $x$, $y$ and $z$ are integers and an oxidizer selected from the class consisting of alkali metal chlorates and perchlorates.

17. A gas generating powder composition as defined in claim 14 further comprising up to about 20 percent by weight of an oxygen bearing organic fuel having a formual $C_xH_yO_z$ where $x$, $y$ and $z$ are integers.

18. A method of inflating an automobile passenger restraint bag comprising the step of directing the gaseous combustion products of a pyrotechnic composition consisting essentially of an inorganic oxidizer compound containing oxygen and a metal selected from the group consisting of sodium, potassium, lithium, barium, magnesium and calcium and an oxygen bearing metal organic compound into a passenger restraint bag, said oxygen bearing metal organic compound selected such that a stoichiometric reaction between the oxidizer and the metal organic compound yields gaseous products and wherein the metal in the metal organic compound has a free energy of oxide formation less than the free energy of oxidation of carbon monoxide, the proportion of metal organic compound being in the range of from about 15 to 75 percent by weight of the powder composition.

19. A method of inflating an automobile passenger restraint bag as defined in claim 18 wherein the oxidizer compound is selected from the group consisting of chlorates and perchlorates.

20. A method of inflating an automobile passenger restraint bag as defined in claim 19 wherein the metal organic compound is selected from the group consisting of cobaltous acetate, cobaltous oxalate, cupric formate, cupric acetate, cupric oxalate, ferric acetate, ferric oxalate, ferrous formate, ferrous acetate, ferrous tartrate, ferrous oxalate, ferrous lactate, lead formate, lead acetate, lead oxalate, nickel formate, nickel acetate, nickel oxalate, silver acetate, silver citrate, silver tartrate, silver oxalate, and stannous oxalate.

21. A method as defined in claim 18 wherein the gas generating powder composition further comprises up to about 20 percent by weight of an oxygen bearing organic fuel having a formula $C_xH_yO_z$ where $x$, $y$ and $z$ are integers.

22. A method of inflating an automobile passenger restraint bag comprising the step of directing the gaseous combustion products of a pyrotechnic composition consisting essentially of an oxidizer compound containing oxygen and a metal selected from the group consisting of sodium, potassium, lithium, barium, magnesium and calcium and an oxygen bearing metal organic compound into a passenger restraint bag, said oxygen bearing metal organic compound selected from the group consisting of cobaltous acetate, cobaltous oxalate, cupric formate, cupric acetate, cupric oxalate, ferric acetate, ferric oxalate, ferrous formate, ferrous acetate, ferrous tartrate, ferrous oxalate, ferrous lactate, lead formate, lead acetate, lead oxalate, nickel formate, nickel acetate, nickel oxalate, silver acetate, silver citrate, silver tartrate, silver oxalate, and stannous oxalate.

23. A method of inflating an automobile passenger restraint bag as defined in claim 22 wherein the oxidizer powder is selected from the group consisting of chlorates and perchlorates.

24. A method as defined in claim 23 wherein the proportion of oxidizer compound is in the range of from about 25 to 85 percent by weight and the proportion of metal organic compound is in the range of from about 15 to 75 percent by weight.

25. A method as defined in claim 24 wherein the metal organic compound comprises anhydrous nickel formate.

26. A method as defined in claim 25 wherein the nickel formate is present at about 25 percent and the oxidizer compound comprises potassium chlorate at about 75 percent.

27. A method as defined in claim 26 wherein the gas generating composition further comprises up to about 20 percent by weight of a burning rate enhancer comprising a substantially stoichiometric mixture of potassium chlorate and an organic fuel having the formula $C_xH_yO_z$ where $x$, $y$ and $z$ are integers.

28. A pyrotechnic powder composition comprising a reaction mixture of one or more oxidizer powder compounds selected from the group consisting of sodium, potassium, lithium, barium, magnesium and calcium chlorates and perchlorates; and one or more reducing metal organic powder compounds selected from the group consisting of copper formate, tin formate, nickel formate and cobalt formate, the proportion of metal organic compound being in the range of from about 15 to 75 percent by weight of the powder composition.

29. A pyrotechnic powder composition consisting essentially of anhydrous nickel formate and oxidizer powder selected from the class consisting of alkali metal chlorates and perchlorates, the proportion of anhydrous nickel formate and oxidizer being sufficiently above the stoichiometric proportion to yield free oxygen upon combustion thereof.

30. A gas generating composition consisting essentially of anhydrous nickel formate in the range of from about 15 to 75 percent by weight and oxidizer selected from the class consisting of alkali metal chlorates and perchlorates in the range of from about 25 percent to 85 percent by weight.

31. A method of inflating an automobile passenger restraint bag comprising the step of directing the gaseous combustion products of anhydrous nickel formate and an oxidizer compound into a passenger restraint bag.

32. A method as defined in claim 31 wherein the oxidizer compound is selected from the group consisting of sodium, potassium, lithium, barium, magnesium, and calcium chlorates and perchlorates.

33. A method as defined in claim 32 wherein the proportion of anhydrous nickel formate is in the range of from about 15 to 75 percent by weight and the oxidizer compound is in the range of from about 25 to 85 percent by weight.

* * * * *